(12) United States Patent
Espinosa

(10) Patent No.: US 11,401,708 B2
(45) Date of Patent: **\*Aug. 2, 2022**

(54) ANCHOR HOLDERS AND ANCHOR ASSEMBLIES FOR METAL DECKS

(71) Applicant: CETRES HOLDINGS, LLC, Jackson, WY (US)

(72) Inventor: Thomas M. Espinosa, Snohomish, WA (US)

(73) Assignee: CETRES HOLDINGS, LLC, Jackson, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/106,425

(22) Filed: Nov. 30, 2020

(65) Prior Publication Data

US 2021/0148110 A1    May 20, 2021

Related U.S. Application Data

(60) Continuation of application No. 16/550,496, filed on Aug. 26, 2019, now Pat. No. 10,851,540, which is a
(Continued)

(51) Int. Cl.
*E04B 1/41* (2006.01)
*E04B 5/40* (2006.01)
(Continued)

(52) U.S. Cl.
CPC .............. *E04B 1/4157* (2013.01); *E04B 1/40* (2013.01); *E04B 1/4121* (2013.01);
(Continued)

(58) Field of Classification Search
CPC ........ E04B 1/4157; E04B 1/40; E04B 1/4121; E04B 1/4128; E04B 1/4164; E04B 5/40;
(Continued)

(56) References Cited

U.S. PATENT DOCUMENTS 3,769,774 A * 11/1973 Barnes ...................... F16L 3/14
                                                            52/698
3,896,599 A *  7/1975 Werstein ............... E04B 1/4157
                                                            52/704
(Continued)

FOREIGN PATENT DOCUMENTS

EP           3575617 A1 * 12/2019   ............ F16B 33/002
JP       2008050772 A   *  3/2008

*Primary Examiner* — Robert Canfield
(74) *Attorney, Agent, or Firm* — Shlesinger, Arkwight & Garvey LLP

(57) ABSTRACT

An anchor holder for concrete decks comprises a body for being inserted into an opening in a metal deck, the body including an outside vertical wall and an opening for receiving an anchor. The body includes arms normally biased extending outwardly from the vertical wall, the arms being collapsible toward the body when the body is inserted into the opening in the metal deck and expanding outwardly after passing the opening to be disposed below the metal deck. A support is attached to the body, the support to engage a top surface of the metal deck to apply an upward force on the body and keep the collapsible arms engaged against an underside of the metal deck when the body is attached to the metal deck.

9 Claims, 11 Drawing Sheets

Related U.S. Application Data continuation of application No. 15/398,112, filed on Jan. 4, 2017, now Pat. No. 10,400,440, which is a division of application No. 14/617,465, filed on Feb. 9, 2015, now Pat. No. 9,567,741, which is a continuation of application No. PCT/US2013/055801, filed on Aug. 20, 2013.

(60) Provisional application No. 61/684,844, filed on Aug. 20, 2012.

(51) Int. Cl.
*E04B 9/18* (2006.01)
*E04C 2/08* (2006.01)
*F16B 13/08* (2006.01)
*F16B 35/04* (2006.01)

(52) U.S. Cl.
CPC .......... *E04B 1/4128* (2013.01); *E04B 1/4164* (2013.01); *E04B 5/40* (2013.01); *E04B 9/18* (2013.01); *E04C 2/08* (2013.01); *F16B 13/0833* (2013.01); *F16B 35/044* (2013.01)

(58) Field of Classification Search
CPC .......... E04B 9/18; E04C 2/08; F16B 13/0833; F16B 35/044
See application file for complete search history.

(56) References Cited

U.S. PATENT DOCUMENTS

| | | | | |
|---|---|---|---|---|
| 4,007,563 | A * | 2/1977 | Nakagawa | E04D 3/3606 52/98 |
| 4,083,162 | A * | 4/1978 | Regan | E04B 1/4121 52/699 |
| 6,240,697 | B1 * | 6/2001 | Thompson | E04B 1/4121 52/698 |
| 7,093,400 | B1 * | 8/2006 | Thompson | E04B 9/18 52/698 |
| 8,267,628 | B2 * | 9/2012 | Noce | E04B 5/40 411/80.6 |
| 9,556,895 | B2 * | 1/2017 | Jung | F16B 33/002 |
| 10,400,440 | B2 * | 9/2019 | Espinosa | E04B 5/40 |
| 10,851,540 | B2 * | 12/2020 | Espinosa | E04B 9/18 |
| 2003/0145437 | A1 * | 8/2003 | Medgyes | F16B 19/1036 24/290 |
| 2004/0208721 | A1 * | 10/2004 | Kuenzel | F16B 13/0858 411/340 |
| 2004/0208722 | A1 * | 10/2004 | Kuenzel | F16B 13/0858 411/340 |

* cited by examiner

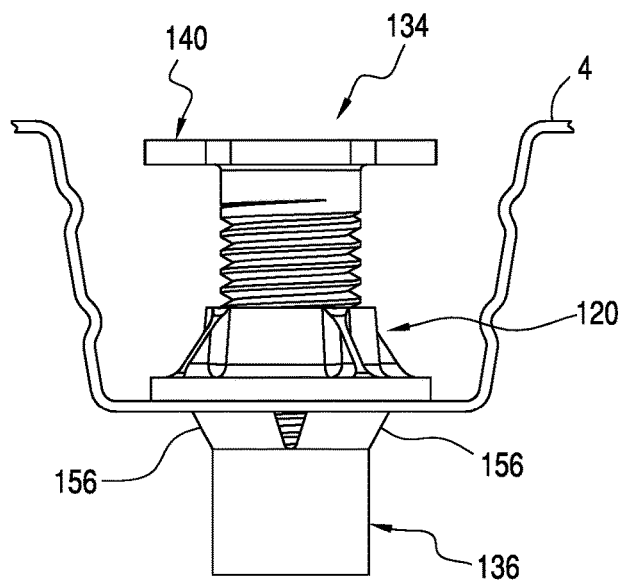
FIG. 19
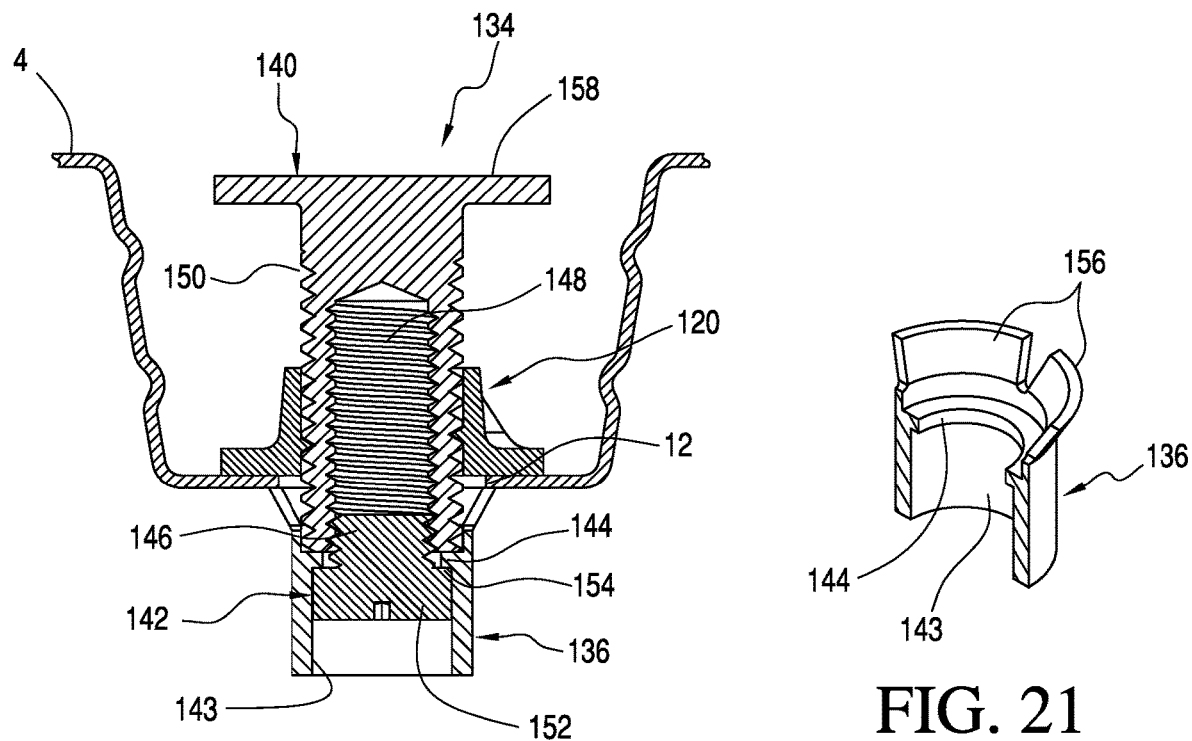
FIG. 20
FIG. 21

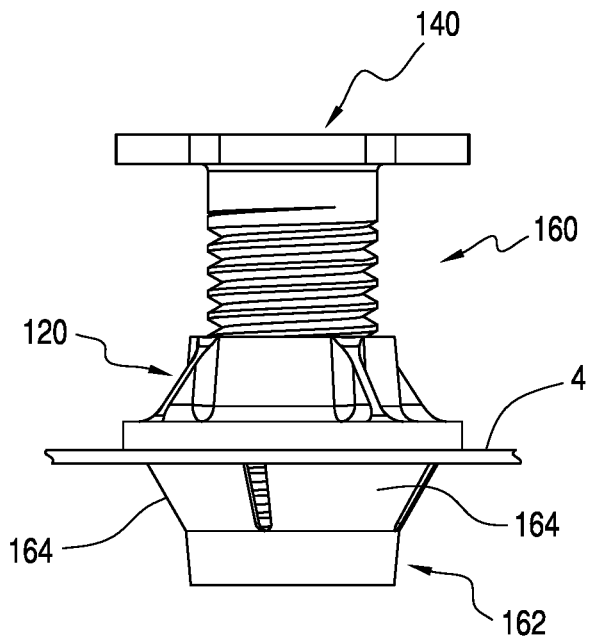
FIG. 22
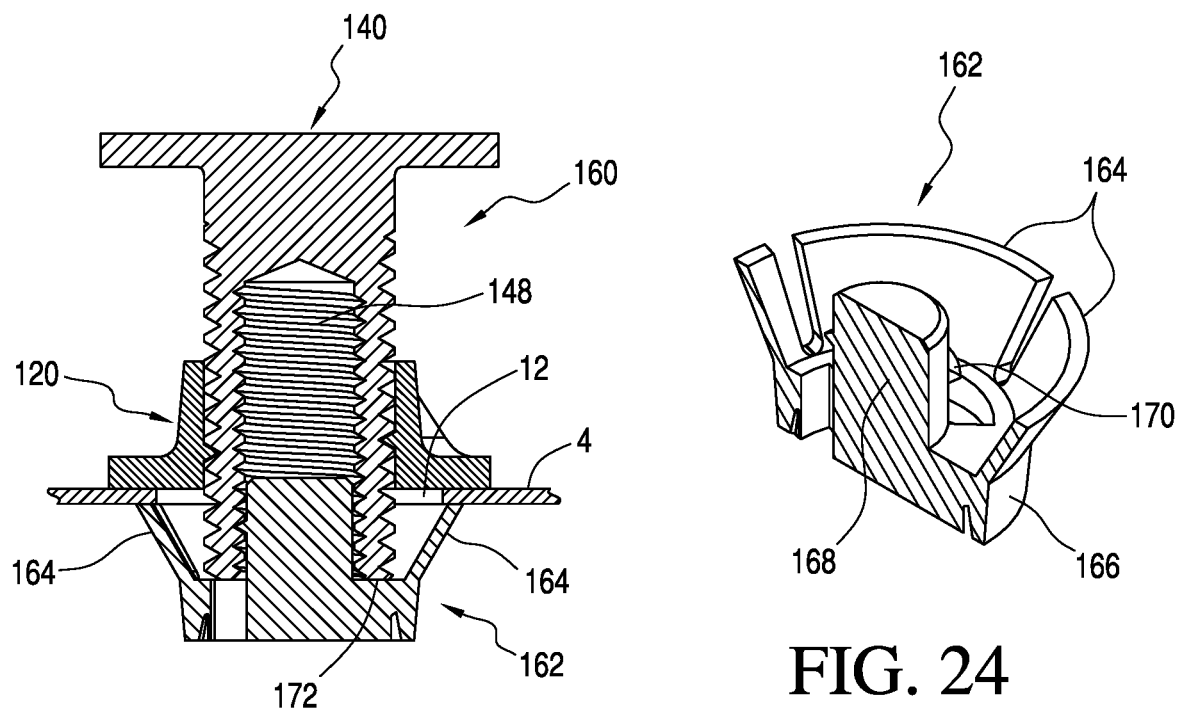
FIG. 23
FIG. 24

ANCHOR HOLDERS AND ANCHOR ASSEMBLIES FOR METAL DECKS

RELATED APPLICATIONS

This is a continuation application of application Ser. No. 16/550,496, filed Aug. 26, 2019, U.S. Pat. No. 10,851,540, which is a continuation application of application Ser. No. 15/398,112, filed Jan. 4, 2017, U.S. Pat. No. 10,400,440, which is a division of application Ser. No. 14/617,465, filed Feb. 9, 2015, U.S. Pat. No. 9,567,741, which is a continuation of International PCT Application No. PCT/US2013/055801, filed Aug. 20, 2013, which claims priority from provisional application Ser. No. 61/684,844, filed Aug. 20, 2012, all of which applications are hereby incorporated by reference.

FIELD OF THE INVENTION

The present invention is generally directed to anchor holders for concrete anchors for positioning the anchors on a concrete form surface prior to pouring concrete, and particularly to anchor holders for attachment to metal decks.

SUMMARY OF THE INVENTION

The present invention provides an anchor holder for concrete decks, comprising a body for being inserted into an opening in a metal deck, the body including an outside vertical wall and an opening for receiving an anchor. The body includes arms normally biased extending outwardly from the vertical wall, the arms being collapsible toward the body when the body is inserted into the opening in the metal deck and expanding outwardly after passing the opening to be disposed below the metal deck. A support is attached to the body, the support to engage a top surface of the metal deck to apply an upward force on the body and keep the collapsible arms engaged against an underside of the metal deck when the body is attached to the metal deck.

The present invention also provides an anchor assembly for attaching to a metal deck, comprising a body for being inserted into an opening in a metal deck, the body including an outside vertical wall, the body including an opening. The body includes arms normally biased extending outwardly from the vertical wall, the arms being collapsible toward the body when the body is inserted into the opening in the metal deck and expanding outwardly after passing the opening to be disposed below the metal deck. A support is attached to the body to keep the body fastened to the metal deck; and an anchor is received with the opening.

The present invention further provides an anchor assembly for attaching to a metal deck, comprising a body for being inserted into an opening in a metal deck, the body including an outside vertical wall, the body including an axial opening; the body including arms normally biased extending outwardly from the vertical wall, the arms being collapsible toward the body when the body is inserted into the opening in the metal deck and expanding outwardly after passing the opening to be disposed below the metal deck. An anchor is received within an upper portion of the body, the anchor including a threaded bore at a bottom end; and a plug attached to the threaded bore. A circumferential ledge is disposed within the body, the ledge being sandwiched between a bottom end of the anchor and the plug. A support is attached to the anchor to keep the body fastened to the metal deck, the support to apply an upward force on the body and keep the collapsible arms engaged against an underside of the metal deck when the body is attached to the metal deck.

The present invention provides an anchor assembly for attaching to a metal deck, comprising a body for being inserted into an opening in a metal deck, said body including an outside vertical wall, the body including arms normally biased extending outwardly from said vertical wall, the arms being collapsible toward the body when the body is inserted into the opening in the metal deck and expanding outwardly after passing the opening to be disposed below the metal deck. An anchor includes a threaded bore at a bottom end. The body includes a plug attached to the threaded bore. A support is attached to the anchor to keep the body fastened to the metal deck, the support to apply an upward force on the body and keep the collapsible arms engaged against an underside of the metal deck when the body is attached to the metal deck.

BRIEF DESCRIPTION OF THE DRAWINGS

FIG. 19 is a side elevational view of another embodiment of an anchor assembly, embodying the present invention.

FIG. 20 is a cross-sectional view of FIG. 19.

FIG. 21 is a perspective cross-sectional view of a sleeve body used in the embodiment of FIG. 19.

FIG. 22 is a side elevational view of another embodiment of an anchor assembly, embodying the present invention.

FIG. 23 is a cross-sectional view of FIG. 22.

FIG. 24 is a perspective cross-sectional view of a plug used in the embodiment of FIG. 22.

DETAILED DESCRIPTION OF THE INVENTION

Figure 1:
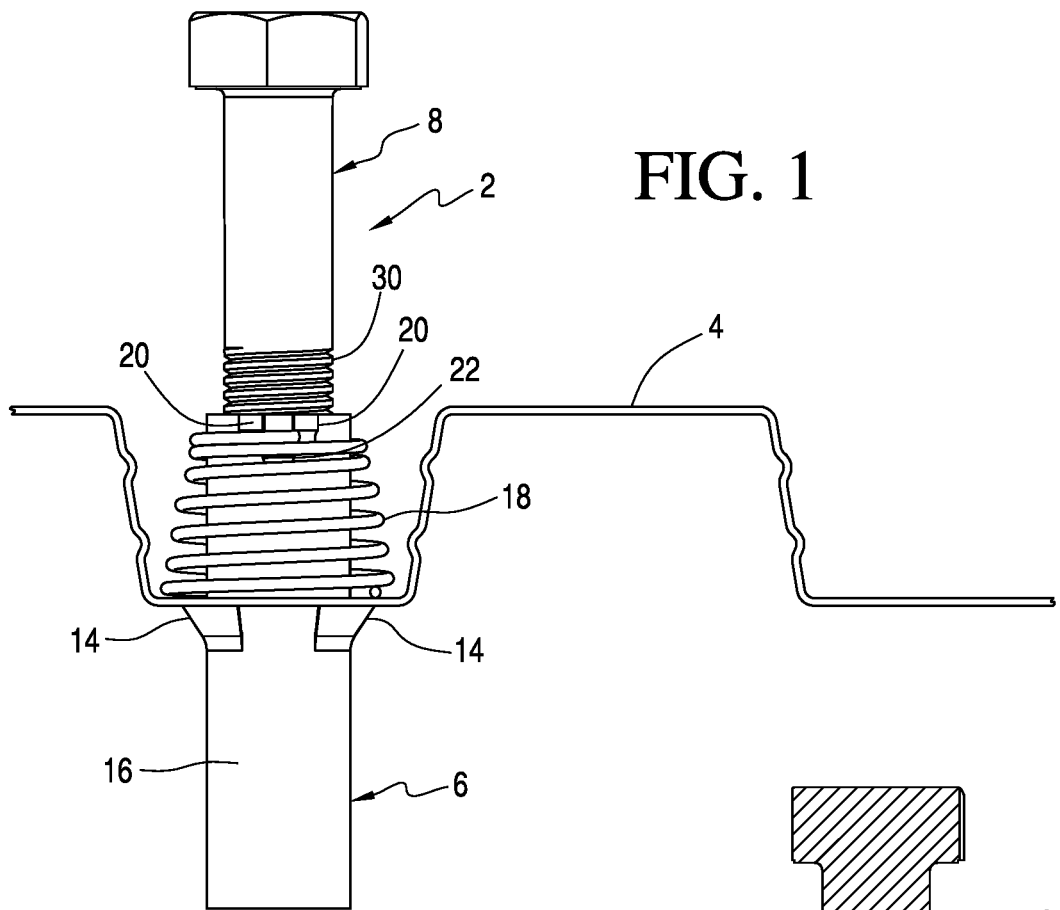
FIG. 1 is a side elevational view of an anchor assembly shown attached to a metal deck prior to concrete pour, embodying the present invention.
Figure 2:
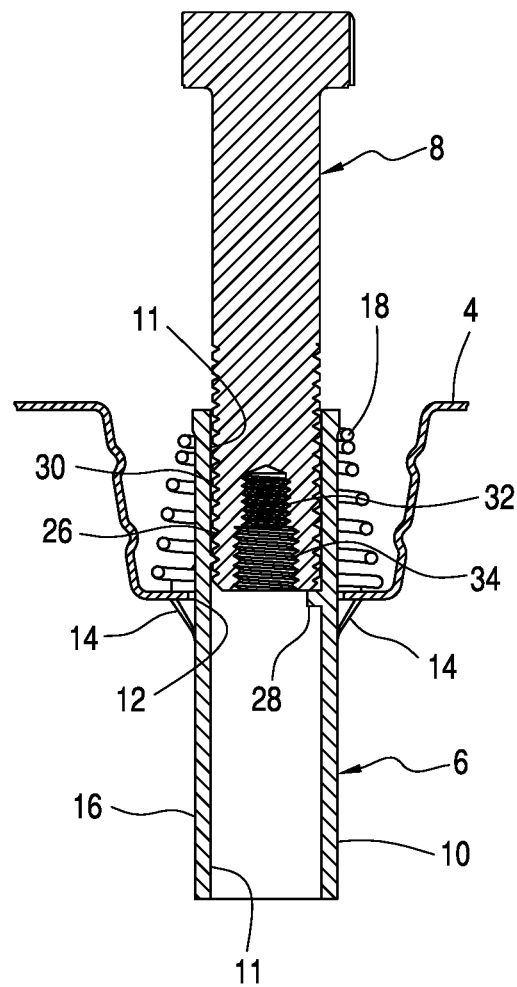
FIG. 2 is a cross-sectional view of FIG. 1.

An anchor assembly 2 for being embedded in concrete to be poured on a metal deck 4 is disclosed in FIGS. 1 and 2. The anchor assembly 2 is for connection to a threaded rod for supporting a load after the concrete has cured. An illustration of manner of use involving other concrete anchors is disclosed in U.S. application Ser. No. 13/424,082, filed on Mar. 19, 2012, hereby incorporated by reference.

The assembly 2 comprises a holder 6 and an anchor 8. The holder 6 has a sleeve body 10 for passing through an opening 12 in the metal deck 4. The sleeve body 10 has a longitudinal opening 11, preferably cylindrical, for receiving the anchor 8.

Figure 4:
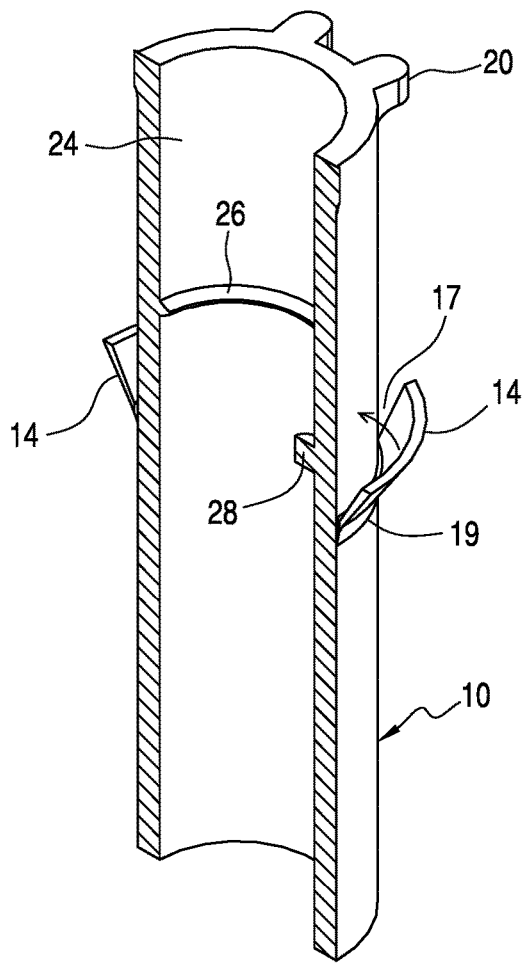
FIG. 4 is a perspective cross-sectional view of a sleeve body used in the embodiment of FIG. 1.

Collapsible arms 14 are attached to an outside vertical wall 16 of the sleeve body 10. The arms 14 are biased in an outward extended position as shown in FIGS. 1, 2, 4, and collapsible inwardly toward the sleeve body 10 as generally indicated by the directional arrow 17 about portion 19, as shown in FIG. 4. When the holder 6 is inserted into the opening 12, the arms 14 are pressed inwardly toward the outside wall 16 by the wall of the opening 12 in the direction generally indicated by the arrow 17 as the arms 14 pass through the opening 12. The opening 12 is sized so that it is large enough to accommodate the diameter of the sleeve body 10 and the arms 14 in the collapsed onto the sleeve body 10. The arms 14 automatically extend outwardly after passing the wall of the opening 12 and remain extended. The sleeve body 10 and the arms 10 are preferably made of plastic. The portion 19 is configured to be flexible enough to allow the collapsing or folding motion of the arms 14.

A spring 18 is attached to an upper portion of the sleeve body 10 and is biased toward the metal deck 4 to tend to draw the sleeve body 10 upwardly, thereby making the arms 14 to engage the underside of the metal deck 4. In this manner, the holder 6 is securely attached to the metal deck 4. It should be understood that the spring 18 is a support that keeps the sleeve body 10 attached to the metal deck and applies an upward force on the sleeve body 10 to keep the arms 14 engaged against the underside of the metal deck 4.

Figure 3:
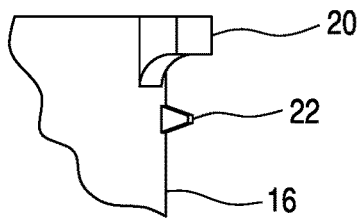
FIG. 3 is an enlarged detail view taken from FIG. 1.

Referring to FIGS. 1 and 3, outwardly extending members 20, preferably arranged around the periphery of the upper edge of the sleeve body 10, hold the spring 18 in check. Two members 20 are shown, but it should be understood that there are two other members 20 on the other half of the sleeve body 10 not shown.

The spring 18 may be helical and conical with increasing diameter from top to bottom to enclose an upper portion of the sleeve body 10 above the metal deck 4. The upper smaller diameter portion of the spring 18 is configured to smaller in diameter than the outer reach of the members 20. A wedge-shaped tab 22, extending outwardly from the outside wall 16 and disposed below the members 20, holds the spring 18 at its upper portion even before the holder 6 is inserted into the opening 12. In this manner, the holder 6 may be installed in the metal deck 4 even without anchor 8 being installed to the holder 6 at the same time.

Referring to FIG. 4, the sleeve body 10 is preferably cylindrical with an inner surface 24 provided with a thread 26. A projection 28 on the inner surface extending inwardly provides a stop for the bottom edge of the anchor 8. The projection 28 may take on any shape while providing the function of a stop for the anchor 8 or the coupling 40 (see FIG. 6). The projection 28 is disposed below the thread 26. The thread 26 is configured to mate with the thread 30 on the anchor 8. The projection 28 is preferably on the same level as the metal deck 4 so that the bottom edge of the anchor 8 does not extend below the underside of the metal deck 4 and is kept above the underside or substantially in line with the metal deck 4.

The anchor 8 is a conventional bolt but modified with threaded bores 32 and 34. The threaded bores 32 and 34 are preferably coaxial with the upper bore 32 having a lesser diameter than the lower bore 34. The provision of different sized bores 32 and 34 advantageously provides the flexibility of using a smaller or larger diameter threaded rod for attaching to the anchor body 8 through the opening 11 to support the required load. The anchor 8, although shown as a bolt, may also be of other types, such as a threaded rod with a nut or metal plate screwed to its upper end (see FIGS. 8 and 25), an L-shaped threaded rod, etc.

Figure 5:
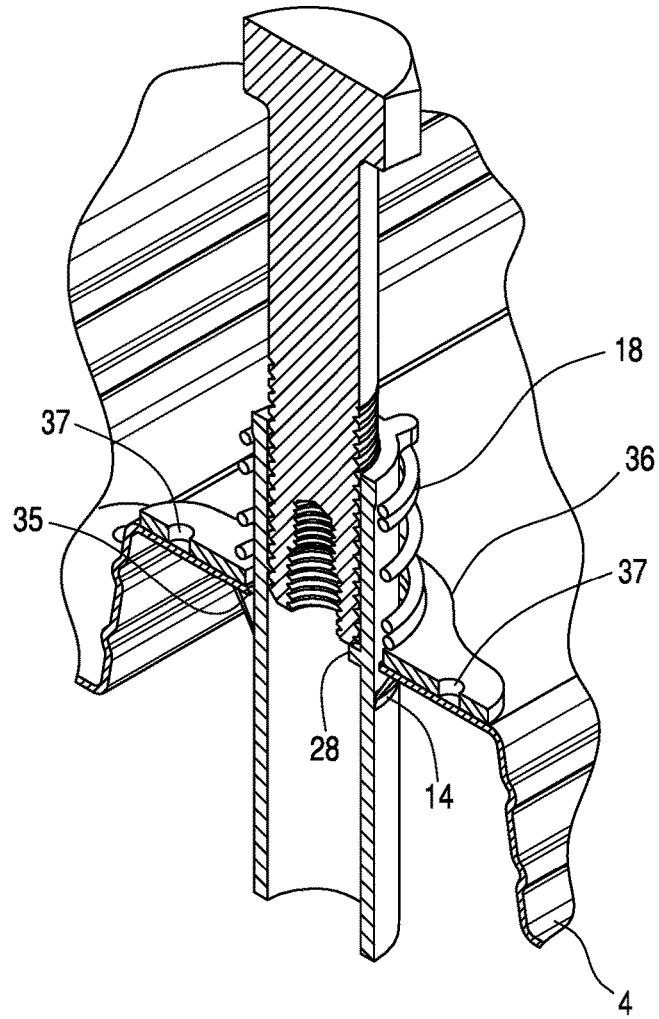
FIG. 5 is a perspective cross-sectional view of another embodiment of FIG. 1, embodying the present invention.

Referring to FIG. 5, a plate 36 may be used between the spring 18 and the metal deck 4 to act as a bearing plate for the spring 18. An opening 35 allows the sleeve body 10 to pass through the plate 36. The plate 36 may be attached to the metal deck 4 with screws through openings 37. The plate 36 may be used when the opening 12 is too large that it would allow the arms 14 in the extended position to pass through. In this manner, with the plate 36 attached to the metal deck 4, the arms 14 will engage the bottom surface of the plate 36, thereby securely attaching the holder 6 to the metal deck 4.

The sleeve body 10 extends below the metal deck 4 to a distance above the thickness of the insulation that would be sprayed on the underside of the metal deck 4 for fireproofing. In this manner, the location of the threaded bores 32 and 34 will not be lost if the bottom end of the sleeve body 10 were buried in the insulation during the spraying process. By having sufficient length to rise above the surface of the insulation, the sleeve body 10 will remain visible.

Figure 6:
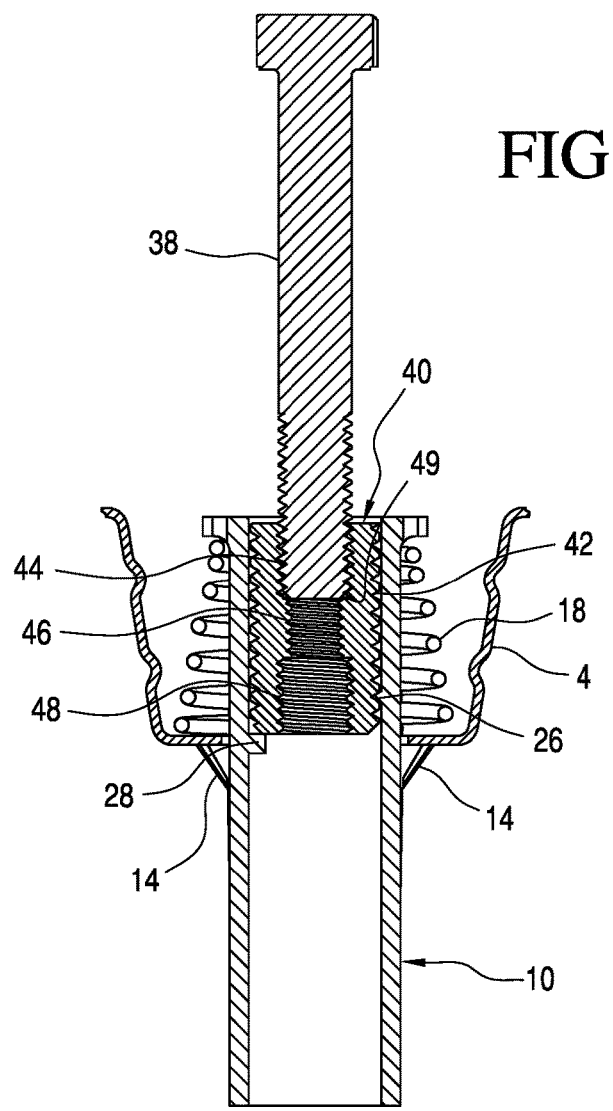
FIG. 6 is a side elevational cross-sectional view of another embodiment of an anchor assembly, embodying the present invention.

Referring to FIG. 6, an anchor 38, such as a standard bolt as modified herein, is threaded to a coupling 40, which in turn is threaded inside the sleeve body 10 to the thread 26. The coupling 40 has thread 42 that mates with the thread 26 inside the body 10.

Threaded bores 44, 46 and 48, preferably coaxial with each other, are provided in the coupling 40. Located related to the two ends of the coupling 40, the bores 44 and 48 are outer bores and the bore 46 is an intermediate bore. The bore 44 is preferably larger in diameter than the bore 46 so that a shoulder 49 is created between the bores 44 and 46. The shoulder 49 advantageously provides a stop to prevent the anchor 38 from accidentally encroaching into the bore 46 when the anchor 38 is screwed into the coupling 40. If the bore 46 is larger or the same diameter as the bore 44, it is possible that the anchor 38 can be screwed deeper than desired, thereby decreasing the depth of the bore 46, in which case the holding capacity of the bore 46 might be lessened.

The threaded bore 46 may be of smaller diameter than the bottom threaded bore 48 so that a smaller or larger diameter threaded rod may be used as the load dictates. The bottom edge of the coupling 40 engages the projection 28 so that the coupling 40 does not extend below the metal deck 4.

Figure 7:
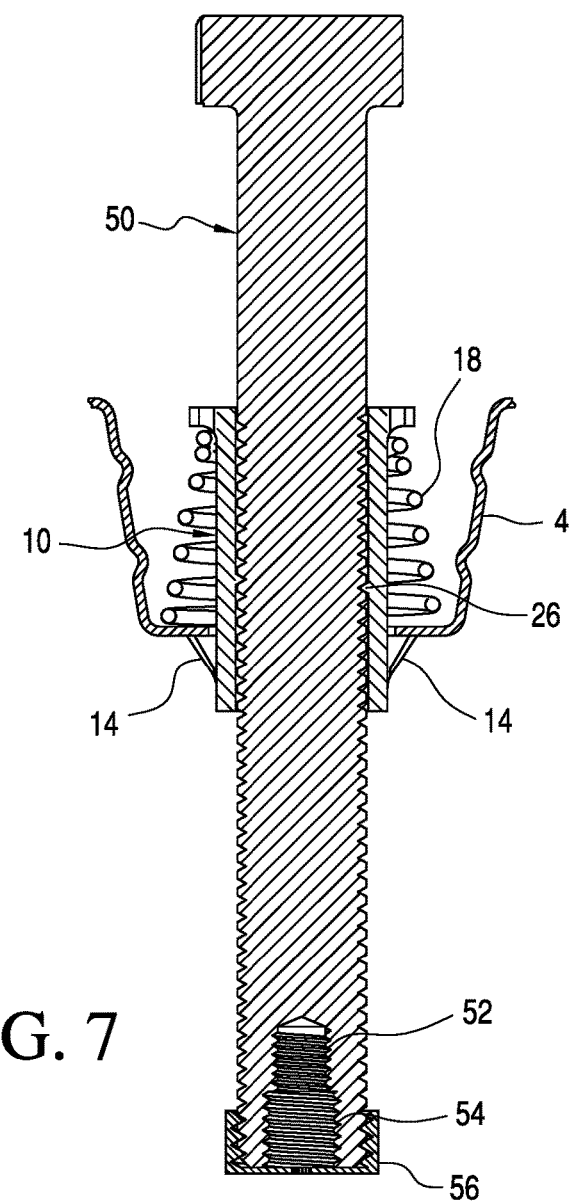
FIG. 7 is a side elevational cross-sectional view of another embodiment of an anchor assembly, embodying the present invention.

Referring to FIG. 7, an anchor 50, such as a standard bolt modified with threaded bores 52 and 54, is disclosed threaded inside the sleeve body 10. The projection 28 is not used to allow the bolt 50 to extend beyond the bottom of the sleeve body 10 to a distance above the thickness of the insulation that will be sprayed on the underside of the metal deck 4 for fireproofing. In this arrangement, the sleeve body 10 may be made shorter than disclosed in FIGS. 1, 5 and 6. Threaded bores 52 and 54 are provided at the bottom end of the bolt 50. The bores 52 and 54 are provided with different diameters, with the inner bore 52 having a smaller diameter than the outer bore 54, to allow a smaller or larger diameter threaded rod to be attached to the anchor 50, depending on the load to be supported by the anchor 50. A cap 56 protects the bores 52 and 54 during spraying of insulation onto the underside of the metal deck 4.

Figure 8:
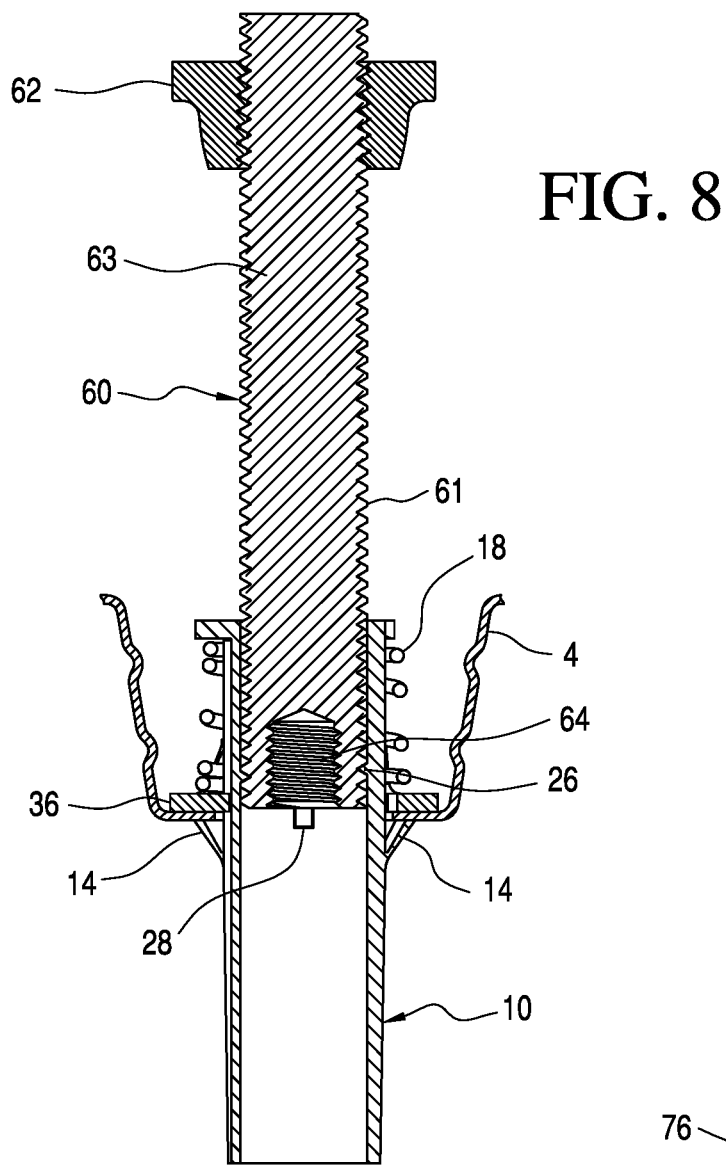
FIG. 8 is a side elevational cross-sectional view of another embodiment of an anchor assembly, embodying the present invention.

Referring to FIG. 8, an anchor 60, such as a threaded rod 63 modified with a threaded bore 64 at the bottom end, is screwed inside the sleeve body 10 using the thread 61 of the rod 63 and the thread 26 inside the sleeve body 10. A threaded body 62 is screwed to upper end portion of the rod 63 to provide the anchorage function when embedded in concrete that will be poured on the metal deck 4. The threaded bore 64 will be used for attaching a threaded rod, which in turn will be attached to a load.

The threaded body 62 may be a standard nut or a threaded body as disclosed in US 2011/0041450, published Feb. 24, 2011, hereby incorporated by reference.

Figure 9:
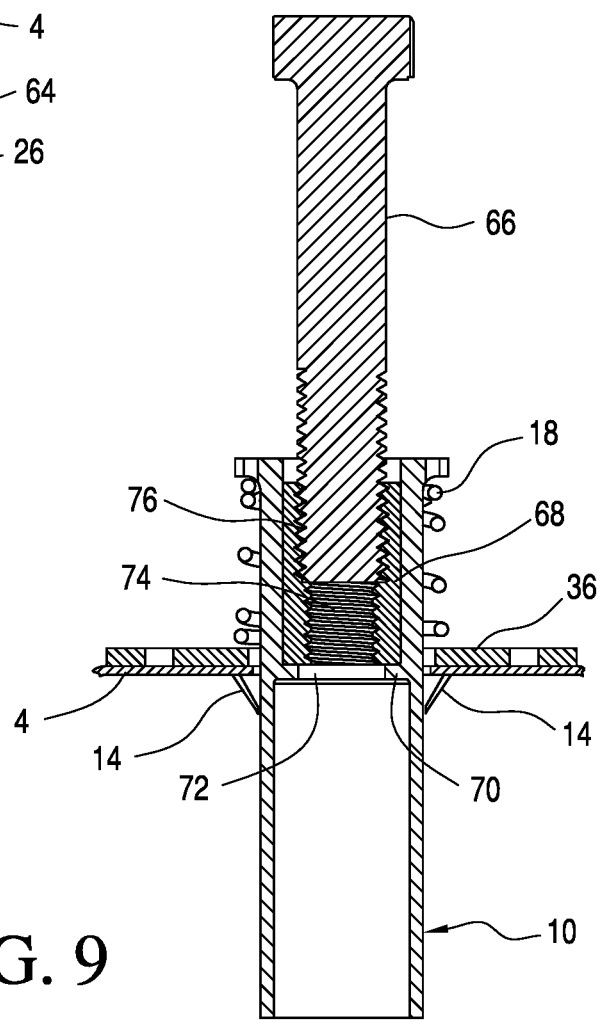
FIG. 9 is a side elevational view of another embodiment of an anchor assembly, embodying the present invention.
Figure 10:
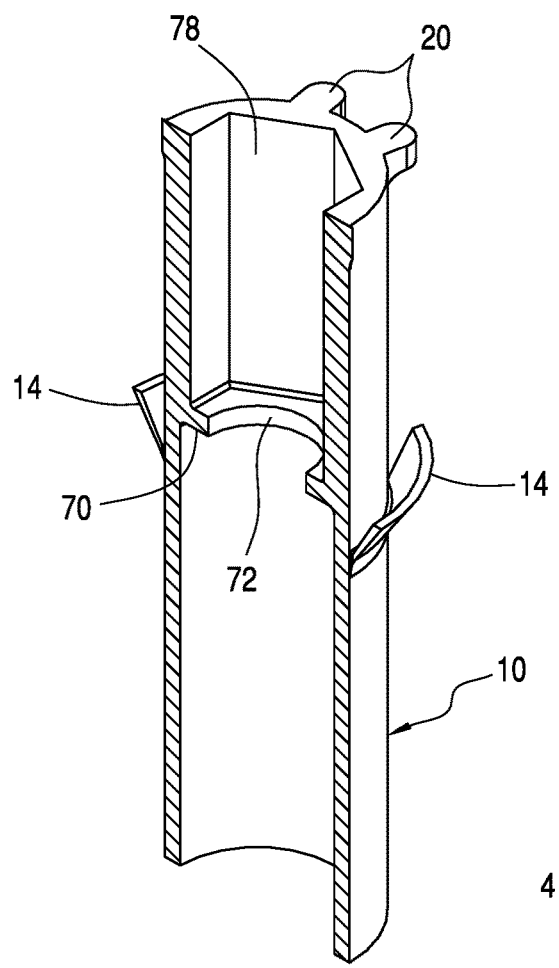
FIG. 10 is a perspective cross-sectional view of a sleeve body used in the embodiment of FIG. 9.

Referring to FIG. 9, an anchor 66, such as a standard bolt, is screwed to a coupling 68, which in turn is disposed inside the sleeve body 10 by friction fit, glue, molded in or other standard method. A circumferential ledge 70 is provided inside the body 10 in lieu of the projection 28, as shown in FIG. 10. The projection 28 may also be used in lieu of the circumferential ledge 70, as it provides the same function of a stop for the anchor 66. An opening 72 provides access to the threaded bore 74. Another threaded bore 76 is used to attach the anchor 66 to the coupling 68.

Figure 11:
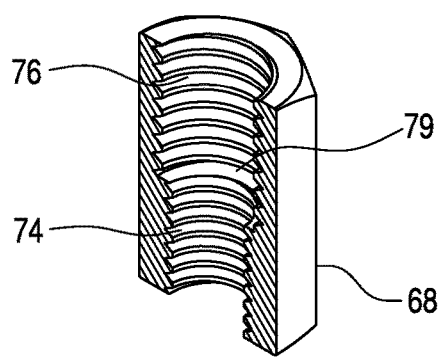
FIG. 11 is a perspective cross-sectional view of a coupling used in the embodiment of FIG. 9.

Referring to FIGS. 10 and 11, the coupling 68 is hexagonal in shape that is received in a correspondingly shaped cavity 78 in the upper portion of the sleeve body 10. The bore 76 is preferably larger in diameter than the bore 74 to provide a shoulder 79 against which the anchor is tightened. The shoulder 79 advantageously provides a stop to insure that the anchor 66 does not extend into the coupling 68 longer than necessary. With this arrangement, the available depth of the threaded bore 74 remains unchanged for attaching to a threaded rod supporting a load.

It should be understood that the circumferential ledge 70 may also be used in the other embodiments where the projection 28 used, as it provides the same function of a stop for the anchor or coupling inserted in the sleeve body.

Figure 12:
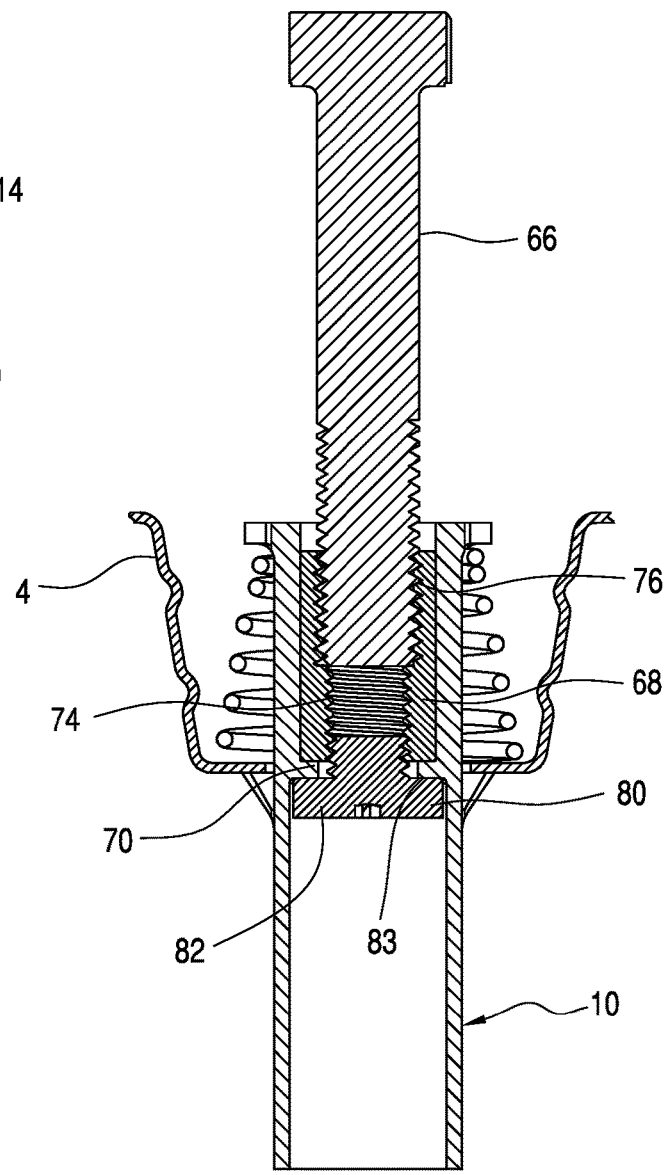
FIG. 12 is a side elevational cross-sectional view of another embodiment of an anchor assembly, embodying the present invention.

Referring to FIG. 12, the coupling 68 may be secured inside the cavity 78 with a threaded plug 80 with a head portion 82 that extends outwardly to define a shoulder 83 that engages the bottom of the ledge 70 when the plug 80 is tightened within the bore 74 and draw the bottom edge of the coupling 78 against the top of the ledge 70, thereby clamping the ledge 70. The plug 80 advantageously protects the bore 68 from overspray when fireproofing insulation is sprayed onto the bottom surface of the metal deck 4.

Figure 13:
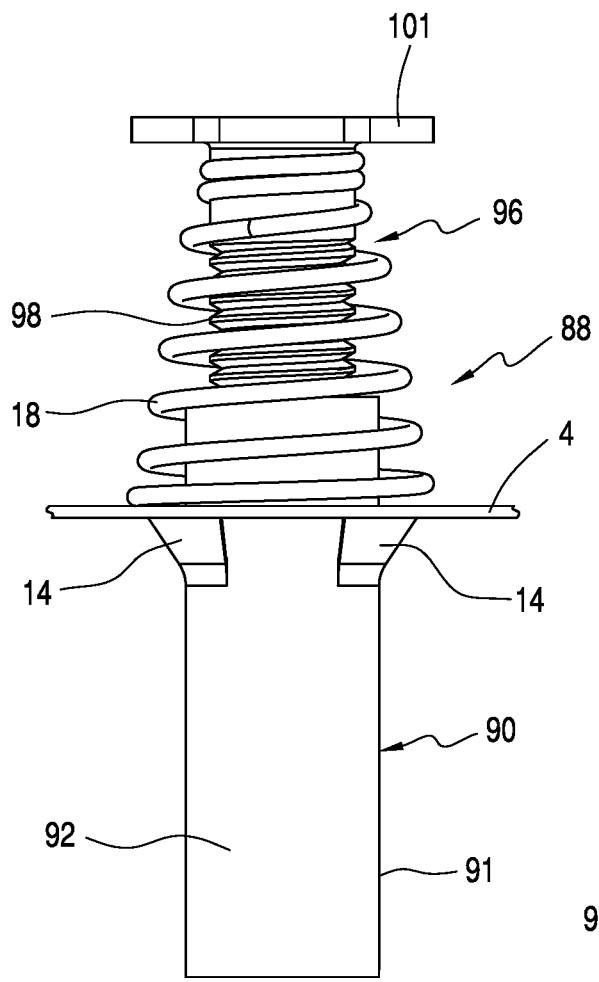
FIG. 13 is a side elevational view of another embodiment of an anchor assembly, embodying the present invention.
Figure 14:
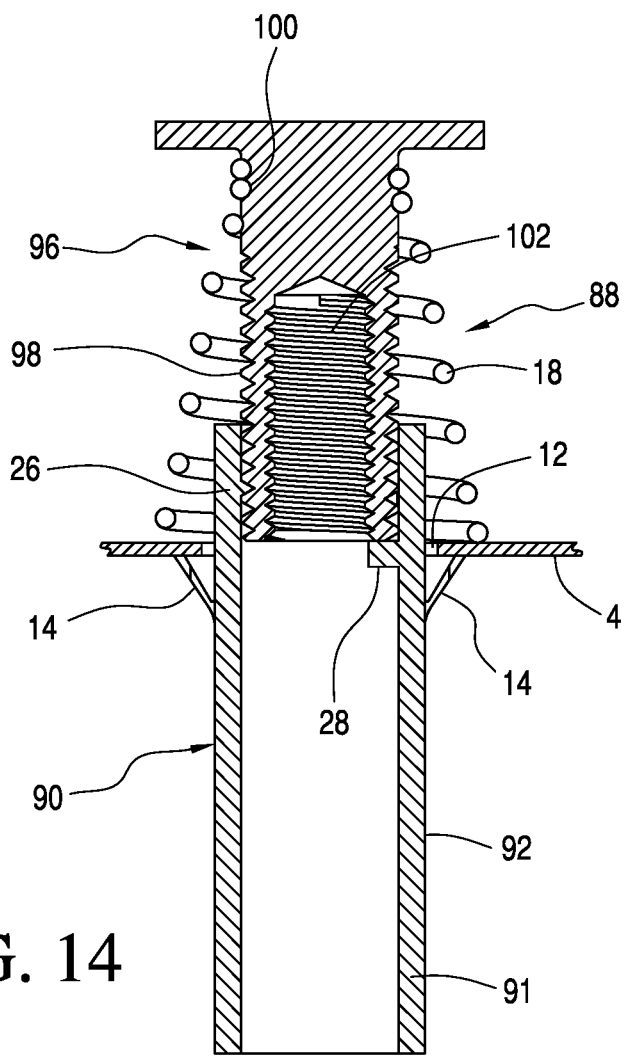
FIG. 14 is a cross-sectional view of FIG. 13.

Another embodiment of an anchor assembly 88 is disclosed in FIGS. 13 and 14. The assembly 88 has a holder 90 including a sleeve body 91 similar to the sleeve body 10 but without the members 20 and the tabs 22. The sleeve body 91 has the same arms 14 that collapse or fold toward the exterior wall 92 as the holder 90 is being inserted into the opening 94 in the metal deck 4. When the arms 14 clear the opening 94, the arms 14 will automatically spread out to keep the sleeve body 91 from being pulled backed out through the opening 94. An anchor 96 with thread 98 is secured inside the upper portion of the sleeve body 91 where the thread 98 of the anchor 96 is engaged with the thread 26. The sleeve body 91 is preferably made of plastic and cylindrical.

The spring 18, preferably helical with increasing diameter from top to bottom, at its upper portion is screwed to a helical groove 100 on an upper portion of the anchor 96. With the spring 18 so attached to the anchor 96, the spring 18 advantageously remains attached to the anchor 96 even before the anchor assembly 88 is attached to the metal deck 4. The anchor 96 includes a head portion 101 that extends outwardly from the threaded portion to provide the anchorage function when embedded in concrete. The head portion 101, being larger than the diameter of the upper portion of the spring 18, provides to keep the spring in place. Preferably, the spring 18 is tightened within the groove 100 against the head portion 101.

The sleeve body 91 includes the projection 28 that provides a stop to the anchor body 96 as it is screwed down into the sleeve body 91. The circumferential ledge 70 may also be used in lieu of the projection 28, as it provides the same function. The anchor 96 is provided with a threaded bore 102 for screwing to a threaded rod that will support a load. The spring 18 is biased against the metal deck 4 to keep the arms 14 engaged against the underside of the metal deck 4.

Figure 15:
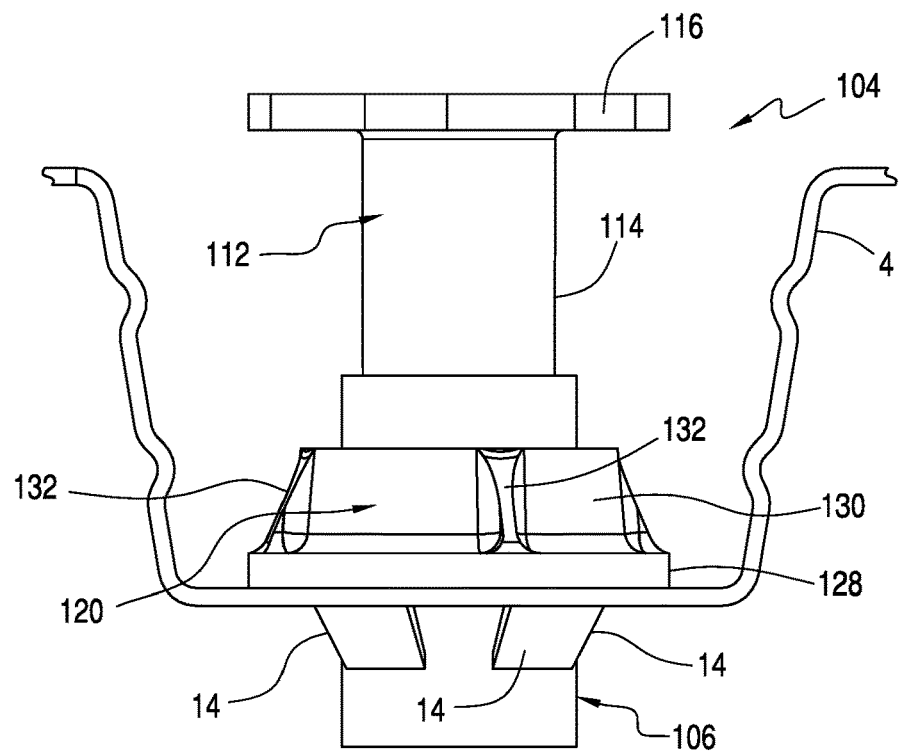
FIG. 15 is a side elevational view of another embodiment of an anchor assembly, embodying the present invention.
Figure 16:
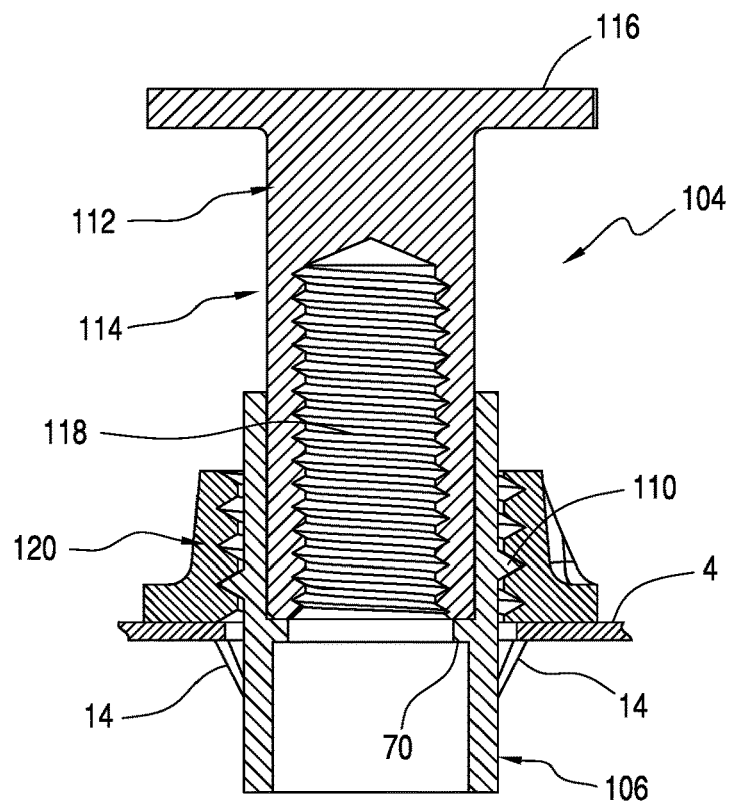
FIG. 16 is a cross-sectional view of FIG. 15.
Figure 17:
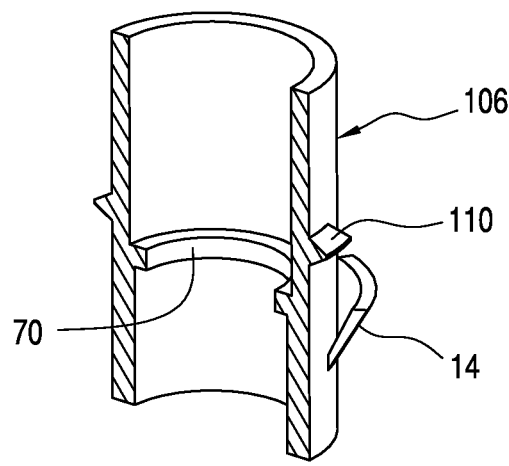
FIG. 17 is a perspective cross-sectional view of a sleeve body used in the embodiment of FIG. 15.

Referring to FIGS. 15, 16 and 17, another embodiment of an anchor assembly 104 for use with metal decks is disclosed. The anchor assembly 104 includes a sleeve body 106 with the collapsible or foldable arms 14. The sleeve body 106 is preferably plastic and cylindrical. The sleeve body 106 has an exterior wall 108 with a thread 110. Inside the sleeve body 106 is the circumferential ledge 70 that engages the bottom portion of an anchor 112. The projection 28 used in the other embodiments may also be used here in lieu of the circumferential ledge 70. The anchor 112 has a rod portion 114, which is friction fit inside the upper portion of the sleeve body 106. The anchor 112 has a head portion 116 that extends outwardly from the rod portion 114 and provides the anchorage function to the anchor assembly 104. A threaded bore 118 is disposed within the rod portion 114 and is used to connect to a threaded rod, which in turn will be connected to a load. A nut 120 is threaded to the thread 110 on the sleeve body 106 and tightened against the top side of the metal deck 4 to provide an upward force on the sleeve body 106 and cause arms 14 to engage the underside of the metal deck 4, thereby securing the anchor assembly 104 in place.

Figure 18:
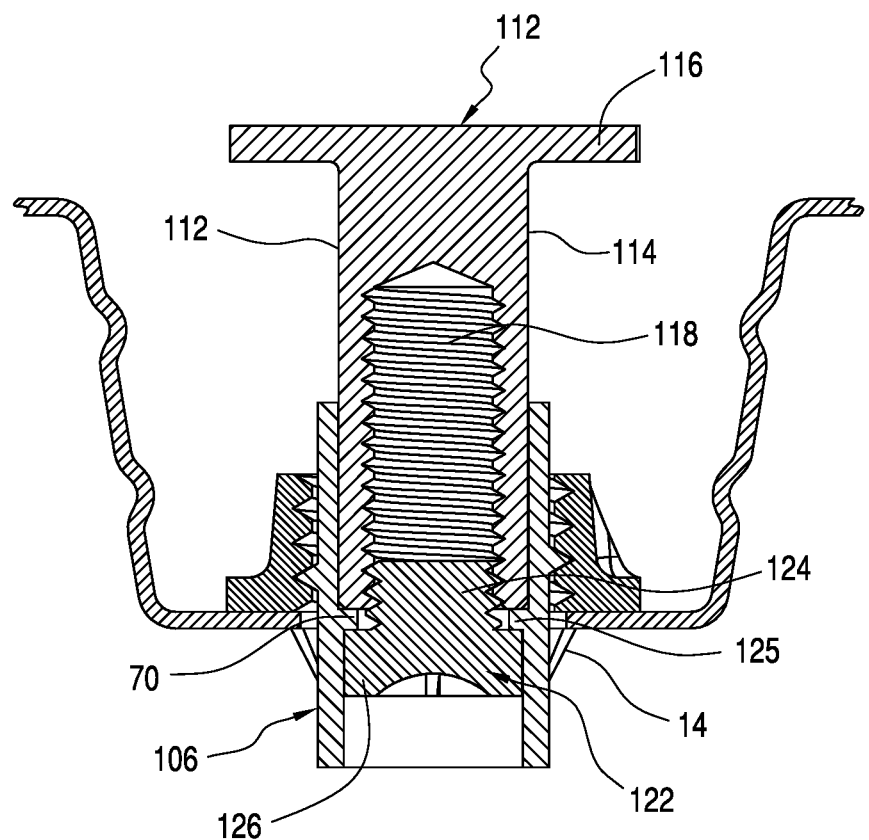
FIG. 18 is a side elevational cross-sectional view of another embodiment of an anchor assembly, embodying the present invention.

Referring to FIG. 18, a plug 122 may be used to securely fasten the anchor 112 inside the sleeve body 106. The plug 122 includes a threaded portion 124 that screws into a threaded bore 118 to draw the bottom edge of the rod portion 112 against the top of the circumferential ledge 70 while at the same time drawing the head portion 126 against the bottom of circumferential ledge 70 in a sandwich configuration. The head portion 126 extends outwardly from the threaded portion 124, defining a shoulder 125 that engages the underside of the ledge 70.

Referring back to FIG. 15, the nut 120 includes a base portion 128 and a conical portion 130 having a smaller diameter than the diameter of the base portion 128. Vertical ribs 132 joined to the exterior of the conical portion 130 and the base portion 128 provide a finger hold for turning the nut 120. The nut 120 is preferably made of plastic.

Referring to FIGS. 19, 20 and 21, another embodiment of an anchor assembly 134 is disclosed. A sleeve body 136 is attached to an anchor 140 by means of a plug 142 inserted through an axial opening 143. The sleeve body 136 includes an inside circumferential ledge 144 that engages a bottom edge of the anchor 140. The plug 142 has a threaded portion or projection 146 that screws into a threaded bore 148 in a rod portion 150 of the anchor 140. The plug 142 has a head portion 152 that extends radially outwardly from the threaded portion or projection 146 to a define a shoulder 154 that engages the bottom portion of the circumferential ledge 144 to sandwich the circumferential ledge 144 with the bottom edge of the rod portion 150. The sleeve body 136 is preferably plastic and cylindrical.

Collapsible or foldable arms 156 are provided at an upper end portion of the sleeve body 136. The collapsible arms 156 are biased in the extended outward position, as shown in the figures and are collapsible or foldable toward the sleeve body 136 when pressed toward the sleeve body 136. The arms 156 function the same way as the arms 14. With the nut 120 disposed towards the head portion 158, the assembly 134 is inserted through the opening 12. As the arms 156 engage the edge of the opening, the arms 156 will fold inwardly allowing the assembly 134 to pass through the opening 12. Once the arms 156 are past the opening 12, the arms 156 automatically expand outwardly. The nut 120 is then tightened against the metal deck 4 drawing the arms 156 up against underneath of the metal deck 4, thereby securely fastening the assembly 134 to the metal deck 4. After the concrete has cured, the plug 142 is removed from underneath the metal deck 4 to gain access to the threaded bore 148, which may be used to attach a threaded rod to support a load. The sleeve body 136 extends below the metal deck 4 so as not to be buried by the fire proofing insulation that will be sprayed onto the underside of the metal deck 4. The plug 142 advantageously keeps the inside of the bore 148 from any overspray.

It should be understood that the spring 18 shown in the other embodiments (see FIGS. 13 and 14) may also be used in lieu of the nut 120 to provide the same function of applying an upward force on the sleeve body 136 to cause the arms 156 to engage the underside of the metal deck 4.

Referring to FIGS. 22, 23 and 24, another embodiment of an anchor assembly 160 is disclosed. The anchor assembly 160 includes the anchor 140 and the nut 120 shown in the previous embodiments. A plug 162 is integrated with the collapsible or foldable arms 164 that work in the same way as the foldable arms 14 and 156. The plug 162 includes a base portion 166 and a cylindrical portion or projection 168 extending upwardly from the base portion 166. A thread 170 is provided on the exterior of the cylindrical portion or projection 168 that mates with the thread in the threaded bore 148. The bottom edge 172 engages the base portion 166 when the cylindrical portion or projection 168 is threaded into the threaded bore 148. The arms 164 fold inwardly when the assembly is inserted into the opening 12 from above and automatically spreads outwardly once they pass the opening 12. The nut 120 tightens the arms 164 against the underside of the metal deck 4, thereby securely fastening the assembly 160 to the metal deck 4.

It should be understood that the spring 18 shown in the other embodiments (see FIGS. 13 and 14) may also be used in lieu of the nut 120 to provide the same function of applying an upward force on the plug 162 to cause the arms 164 to engage the underside of the metal deck 4.

Figure 25:
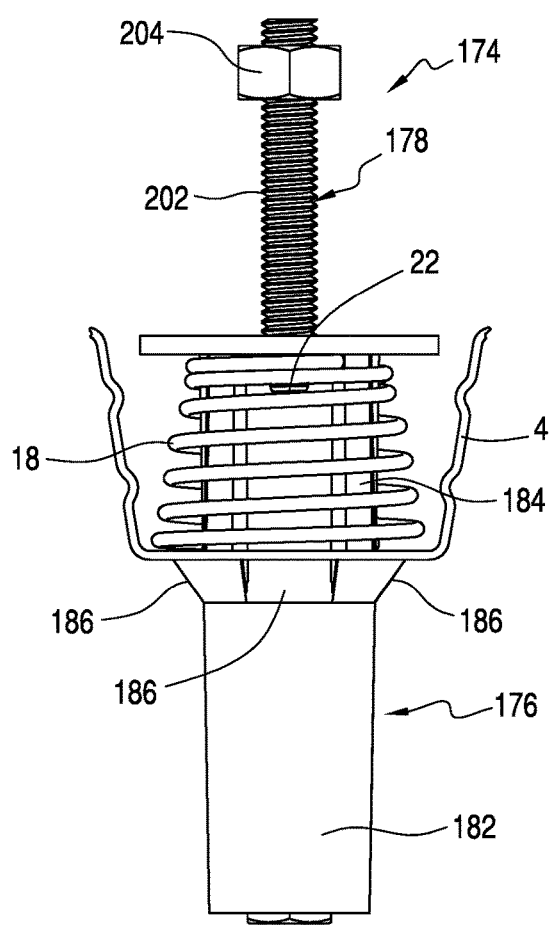
FIG. 25 is a side elevational view of another embodiment of an anchor assembly, embodying the present invention.
Figure 26:
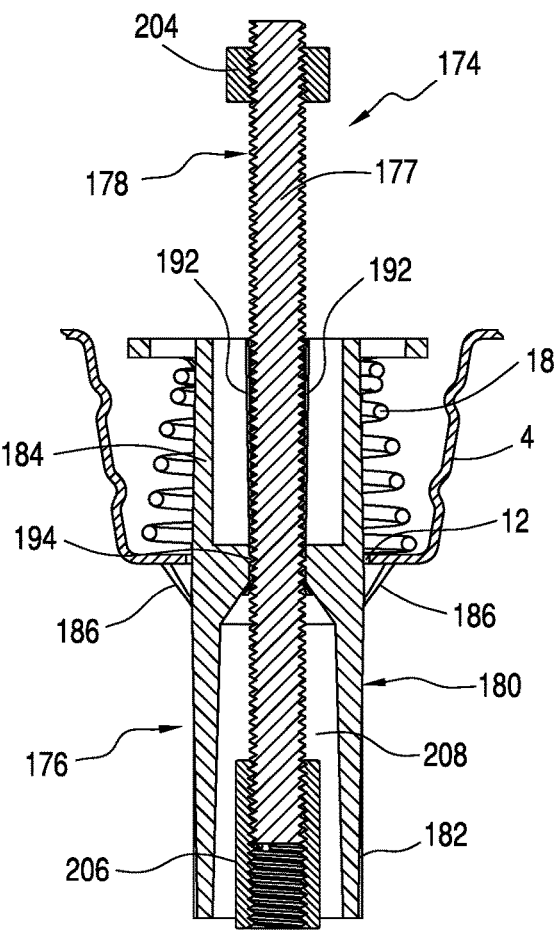
FIG. 26 is cross-sectional view of FIG. 25.
Figure 27:
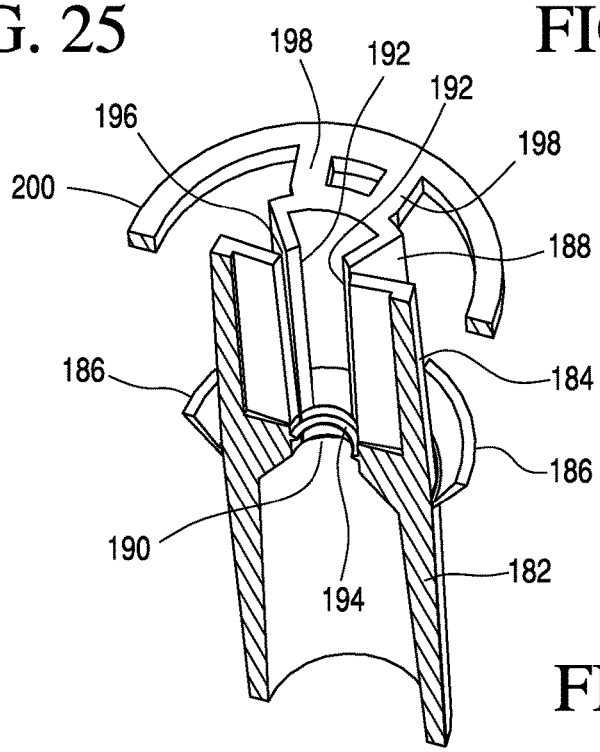
FIG. 27 is a perspective cross-sectional view of a holder used in the embodiment of FIG. 25.

Another embodiment of an anchor assembly 174 is disclosed in FIGS. 25, 26 and 27. The anchor assembly 174 includes a holder 176 and an anchor 178. The holder 176 is preferably made of plastic. The holder 176 comprises a body 180 having a lower cylindrical portion 182 and an upper portion 184. Collapsible or foldable arms 186, which work in the same way as the arms 14, 156 and 164 disclosed in the previous embodiments, are disposed at an upper portion of the lower cylindrical portion 182. The arms 186 are biased extended outwardly as shown in their normal position in FIGS. 25-27, and are configured to collapse or fold inwardly as the holder 176 is passed through the opening 12 in the metal deck 4. When the arms 186 pass the opening 12, they unfold outwardly to prevent the holder 176 from being pulled upwardly, since the arms 186 will engage the underside of the metal deck 4.

The upper portion 184 is made up of the plurality of longitudinal U-shaped members 188 joined at a bottom portion around an opening 190. There are four of the members 188, although only one is shown as a complete unit in FIG. 27. Each member 188 includes vertical edges 192, which provide vertical support to a rod portion 177 of anchor 178. Between adjacent members 188 is a slit 196 along the adjacent vertical edges 196. The opening 190 is preferably cylindrical with a thread 194 for mating with the thread of the anchor 178.

The spring 18 is compressed between the top of the metal deck 4 and transverse members 198, thereby biasing the holder 176 upwardly to cause the arms 186 to engage the underside of the metal deck 4. In this way, the holder 176 is securely attached to the metal deck 4. The wedge-shaped tab 22 and the transverse members 198 hold between them an upper portion of the spring 18 so that the spring 18 is held to the holder 176 even prior to the holder being inserted into the opening 12. The members 198 are joined at their outer ends to a ring member 200. The other ends of the members 198 are joined to respective U-shaped members 188.

The anchor 178 includes the threaded rod portion 177 with a nut 204 attached to its upper end which will be embedded in concrete and a coupling 206 attached to its lower end. The lower portion 182 of the holder 176 has cavity 208 configured to receive within the coupling 206.

The rod portion 177 with the coupling 206 removed is inserted into the upper portion 184. Since the vertical edges 192 are the only surfaces in contact with the rod 202, less resistance is encountered, as compared to a cylindrical opening, thereby facilitating the installation of the rod. The vertical edges 192 may also flex during insertion of the rod 202, further facilitating the insertion of the rod portion 177. The rod portion 177 is then screwed with the thread 194 in the opening 190.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. An anchor assembly for attaching to a metal deck, comprising:
   a) a body for being inserted into an opening in a metal deck, the body including an outside vertical wall, the body including an opening;
   b) the body including arms extending outwardly from the vertical wall, the arms being collapsible toward the body when the body is inserted into the opening in the metal deck and expanding outwardly after passing the opening to be disposed below the metal deck;

c) a support attached to the body to keep the body fastened to the metal deck;

d) an anchor received within the opening of the body, the anchor including a bottom end disposed above the metal deck; and e) the body including a projection inside the opening of the body to prevent the bottom end of the anchor from extending below the metal deck.

2. An anchor assembly as in claim 1, wherein the bottom end of the anchor includes a threaded bore.

3. An anchor assembly as in claim 1, wherein the bottom end of the anchor includes multiple diameter threaded bores.

4. An anchor assembly as in claim 2, wherein a cap is attached to the bottom end to cover the threaded bore.

5. An anchor assembly as in claim 1, and further comprising:

a) a coupling disposed within the opening of the body; and b) the bottom end of the anchor is attached to the coupling.

6. An anchor assembly for attaching to a metal deck, comprising:

a) a body for being inserted into an opening in a metal deck, the body including an outside vertical wall, the body including an opening;

b) the body including arms extending outwardly from the vertical wall, the arms being collapsible toward the body when the body is inserted into the opening in the metal deck and expanding outwardly after passing the opening to be disposed below the metal deck;

c) a support attached to the body to keep the body fastened to the metal deck;

d) an anchor including a bottom end extending completely through the opening of the body below the metal deck; and e) the bottom end including a threaded bore.

7. The anchor assembly as in claim 6, wherein the anchor includes a head portion.

8. The anchor assembly as in claim 6, wherein the anchor is a bolt.

9. The anchor assembly as in claim 6, and further comprising a cap attached to the bottom end.

\* \* \* \* \*